(12) United States Patent  
Kodama et al.

(10) Patent No.: US 9,081,321 B2
(45) Date of Patent: Jul. 14, 2015

(54) CHARGING MEMBER AND ELECTROPHOTOGRAPHIC APPARATUS

(71) Applicant: CANON KABUSHIKI KAISHA, Tokyo (JP)

(72) Inventors: Masataka Kodama, Mishima (JP); Taichi Sato, Numazu (JP); Noriko Suzumura, Mishima (JP); Noriyuki Doi, Numazu (JP); Masahiro Kurachi, Fujisawa (JP); Hiroki Masu, Numazu (JP); Noriaki Kuroda, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/933,925

(22) Filed: Jul. 2, 2013

(65) Prior Publication Data

US 2013/0295330 A1 Nov. 7, 2013

Related U.S. Application Data

(63) Continuation of application No. PCT/JP2013/051260, filed on Jan. 23, 2013.

(30) Foreign Application Priority Data

Feb. 6, 2012 (JP) ................................ 2012-023151

(51) Int. Cl.
  *D06N 7/00* (2006.01)
  *G03G 15/02* (2006.01)
  *C09D 183/06* (2006.01)

(52) U.S. Cl.
  CPC .......... *G03G 15/0233* (2013.01); *C09D 183/06* (2013.01); *G03G 15/02* (2013.01); *Y10T 428/24405* (2015.01)

(58) Field of Classification Search
None
See application file for complete search history.

(56) References Cited

U.S. PATENT DOCUMENTS 7,962,068 B2 * 6/2011 Kuroda et al. ................. 428/447
8,447,214 B2 * 5/2013 Tomomizu et al. ........... 428/446

(Continued)

FOREIGN PATENT DOCUMENTS

JP  2005-345801 A  12/2005
JP  2006-293004 A  10/2006

(Continued)

OTHER PUBLICATIONS

Non-Patent Literature No. 1—"Surface Roughness" <http://us.misumi-ec.com/pdf/press/us_12e_pr1257.pdf>.*

(Continued)

*Primary Examiner* — David Sample
*Assistant Examiner* — Donald M Flores, Jr.
(74) *Attorney, Agent, or Firm* — Canon U.S.A. Inc., IP Division

(57) ABSTRACT

There is provided a charging member having charging performance that is not easily changed even by long-term use.
The charging member includes an electro-conductive support, an elastic layer, and a surface layer. The elastic layer contains particles in such a manner that at least a part of the particles are exposed from the elastic layer, and thus a surface of the elastic layer is roughened. The particles are high-molecular-weight polyethylene particles. The surface of the elastic layer is covered with the surface layer in such a manner that the surface shape of the elastic layer is reflected in the surface shape of the charging member. The surface layer contains a high-molecular compound having a specific constitutional unit.

12 Claims, 2 Drawing Sheets

(56) References Cited

U.S. PATENT DOCUMENTS

| | | | |
|---|---|---|---|
| 2006/0029428 A1* | 2/2006 | Taniguchi et al. | 399/176 |
| 2006/0087530 A1* | 4/2006 | Furukawa | 347/33 |
| 2008/0292366 A1 | 11/2008 | Akama | |
| 2011/0217072 A1 | 9/2011 | Kuroda | |
| 2012/0045250 A1* | 2/2012 | Harada et al. | 399/168 |
| 2012/0076539 A1* | 3/2012 | Sato et al. | 428/149 |
| 2012/0082481 A1* | 4/2012 | Nagamine et al. | 428/446 |
| 2012/0141159 A1* | 6/2012 | Nagamine et al. | 399/111 |
| 2012/0148306 A1* | 6/2012 | Tomomizu et al. | 428/446 |
| 2013/0004206 A1* | 1/2013 | Kuroda et al. | 399/176 |
| 2013/0034369 A1* | 2/2013 | Masu et al. | 428/446 |

FOREIGN PATENT DOCUMENTS

| | | |
|---|---|---|
| JP | 2009-086263 A | 4/2009 |
| JP | 2012-093727 A | 5/2012 |
| WO | 2006/001171 A1 | 1/2006 |
| WO | 2011/080906 A1 | 7/2011 |
| WO | 2012/008122 A1 | 1/2012 |

OTHER PUBLICATIONS

[NPL #1] "Surface Roughness" JIS B 0601 (1994); <http:/us.misumi-ec.com/pdf/press/us_12e_pr1257.pdf>.*

* cited by examiner

CHARGING MEMBER AND ELECTROPHOTOGRAPHIC APPARATUS

CROSS-REFERENCE TO RELATED APPLICATIONS

This application is a Continuation of International Patent Application No. PCT/JP2013/051260, filed Jan. 23, 2013, which claims the benefit of Japanese Patent Application No. 2012-023151, filed Feb. 6, 2012, both of which are hereby incorporated by reference herein in their entirety.

TECHNICAL FIELD

The present invention relates to a charging member and an electrophotographic apparatus.

BACKGROUND ART

In electrophotographic apparatuses, a contact charging system is known in which a voltage is applied to a roller-shaped charging member arranged in contact with a surface of a drum-shaped photosensitive member to cause microdischarge to occur in the vicinity of a nip therebetween, thereby electrostatically charging the surface of the photosensitive member.

As the charging member used in the contact charging system, as disclosed in PTL 1, it is common to incorporate particles into a surface layer to cause its surface to roughen in order to reduce, for example, the adhesion of a developer to the surface and stabilize the discharge.

Meanwhile, PTL 2 discloses a charging member having a charging ability improved by arranging a thin surface layer on an electrically conductive elastic layer, the thin surface layer containing a polysiloxane having an oxyalkylene group.

CITATION LIST

Patent Literature

PTL 1 Japanese Patent Laid-Open No. 2005-345801
PTL 2 Japanese Patent Laid-Open No. 2009-086263

As described in PTL 1, in the charging member having a surface roughened by incorporating fine particles into the surface layer, the surface layer wears gradually because of its repeated contact with the photosensitive member. As a result, the fine particles may fall off the surface layer to change the shape of the surface layer of the charging member. Thus, the charging performance of the charging member may change with time.

Accordingly, it is an object of the present invention to provide a charging member having charging performance that is not easily changed even by long-term use.

Furthermore, it is another object of the present invention to provide an electrophotographic apparatus capable of stably forming a high-quality electrophotographic image.

SUMMARY OF INVENTION

The present invention provides a charging member including an electro-conductive support, an elastic layer containing electro-conductive particles dispersed in the elastic layer, and a surface layer, in which the elastic layer holds polyethylene particles in such a manner that at least a part of the polyethylene particles are exposed from the elastic layer, and a surface of the elastic layer is roughened thereby, the surface of the elastic layer is covered with the surface layer in such a manner that the surface shape of the elastic layer is reflected in the surface shape of the charging member, and in which the surface layer contains a high-molecular compound having a constitutional unit represented by formula (1):

(wherein in formula (1), $R_1$ and $R_2$ each independently represent any one of formulae (2) to (5):

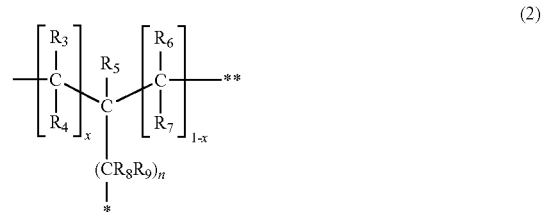

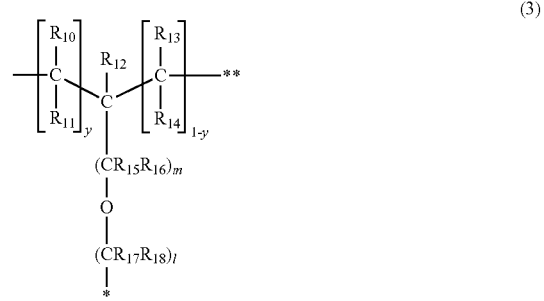

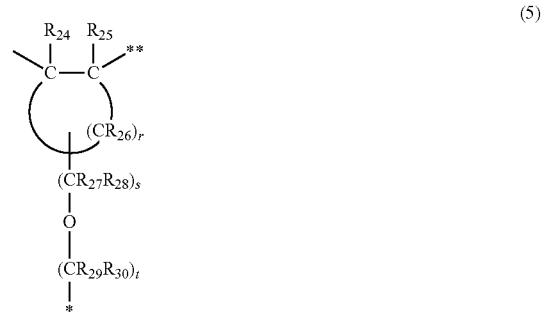

wherein in formulae (2) to (5), $R_3$ to $R_7$, $R_{10}$ to $R_{14}$, $R_{19}$, $R_{20}$, $R_{24}$, and $R_{25}$ each independently represent hydrogen, an alkyl group having 1 to 4 carbon atoms, a hydroxy group, a carboxyl group, or an amino group; $R_8$, $R_9$, $R_{15}$ to $R_{18}$, $R_{22}$, $R_{23}$, and $R_{27}$ to $R_{30}$ each independently represent hydrogen or an alkyl group having 1 to 4 carbon atoms; n, m, l, q, s, and t each independently represent an integer of 1 to 8; p and r each independently represent an integer of 4 to 12; x and y each independently represent 0 or 1; each of the symbols "*" represents a binding site to a corresponding one of the silicon atoms in formula (1); and each of the symbols "**" represents a binding site to a corresponding one of the oxygen atoms in formula (1)).

Furthermore, the present invention provides an electrophotographic apparatus including an electrophotographic photosensitive member and a charging member arranged in contact with the electrophotographic photosensitive member, wherein the charging member is the afore-mentioned charging member.

Further features of the present invention will become apparent from the following description of exemplary embodiments with reference to the attached drawings.

DESCRIPTION OF EMBODIMENTS

Figure 1:
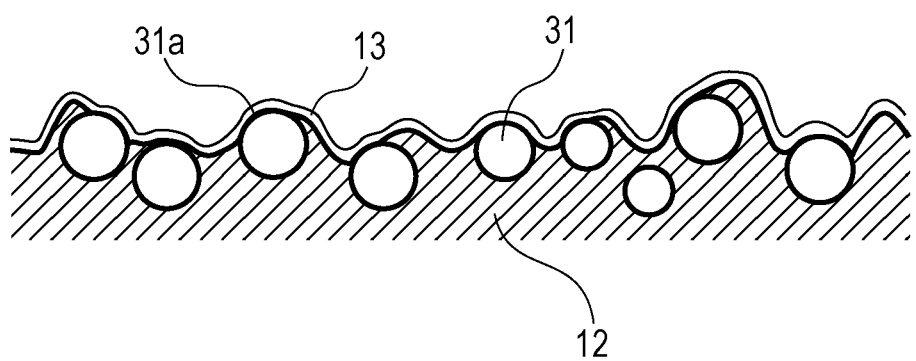
FIG. 1 is a schematic view illustrating a surface state of a charging member according to the present invention.

A charging member of the present invention includes an electro-conductive support, an elastic layer, and a surface layer.

Electro-Conductive Support

The electro-conductive support has strength sufficient to hold the elastic layer and the surface layer provided thereon and has conductivity. Examples of a material for the electro-conductive support that may be used include metals, such as iron, copper, stainless steel, aluminum, and nickel, and alloys thereof. The electro-conductive support may be subjected to surface treatment, such as plating treatment, on its surface in order to impart scratch resistance to the electro-conductive support to the extent that the electrical conductivity is not impaired.

Elastic Layer

The elastic layer imparts the charging member to conductivity and elasticity to enable the formation of a nip between the charging member and a photosensitive member. The elastic layer may be formed from a base polymer and an additive. The base polymer may be any material having rubber elasticity in the operating temperature range of the charging member.

Specific examples of the base polymer are given below.

Specific examples thereof include natural rubber (NR), isoprene rubber (IR), butadiene rubber (BR), styrene-butadiene (SBR), isobutylene-isoprene rubber (IIR), ethylene-propylene-diene terpolymers (EPDM), epichlorohydrin homopolymers (CHC), epichlorohydrin-ethylene oxide copolymers (CHR), epichlorohydrin-ethylene oxide-allyl glycidyl ether terpolymers (CHR-AGE), acrylonitrile-butadiene copolymers (NBR), hydrogenated acrylonitrile-butadiene copolymers (H-NBR), chloroprene rubber (CR), and acrylic rubber (ACM and ANM).

Thermosetting rubber materials prepared by compounding cross-linking reagents into the base polymers, and, for example, polyolefin-, polystyrene-, polyester-, polyurethane-, polyamide-, and vinyl chloride-based thermoplastic elastomers may also be used as the base polymer.

The elastic layer according to the present invention holds particles composed of a high-molecular-weight polyethylene (hereinafter, referred to as "polyethylene particles") in such a manner that at least some of the polyethylene particles are exposed from the elastic layer. The surface of the elastic layer is roughened by the polyethylene particles in which some of the polyethylene particles are exposed from the elastic layer.

The polyethylene particles have high hardness, so the particles are not easily ground even in a polishing step in the course of the formation of the elastic layer described below. It is thus possible to expose at least some of the particles from the elastic layer while the spherical shape thereof is maintained.

The charging member according to the present invention is covered with the surface layer described below in such a manner that the surface of the elastic layer roughened by the polyethylene particles is reflected in the surface shape of the charging member. Together with the high stiffness of the surface layer itself, the surface shape of the charging member is well maintained even when the charging member is pressed against the photosensitive member at the nip.

The weight-average molecular weight of the polyethylene constituting the polyethylene particles according to the present invention is preferably two million or more. When the weight-average molecular weight of the polyethylene constituting the polyethylene particles is two million or more, it is possible to suppress the deformation of the polyethylene particles at the nip formed between the charging member and the photosensitive member and inhibit an increase in the area of contact with the photosensitive member. The hardness of the polyethylene particles is low, compared with inorganic particles composed of, for example, silica and alumina. It is thus possible to inhibit the abrasion of a surface of the photosensitive member in practical use.

As a guide, the polyethylene particles preferably have an average particle size of 5 μm or more and 40 μm or less and particularly preferably 10 μm or more and 35 μm or less. An average particle size falling within this range results in the inhibition of an increase in contact surface when the charging member is pressed against the photosensitive member. Furthermore, at an average particle size falling within this range, it is possible to easily provide the charging member having a surface shape capable of effectively inhibiting the adhesion of toner and so forth to the surface of the charging member.

Here, as the average particle size of the polyethylene particles, a length-average particle size determined by a measurement method described below may be used. A particle image captured with a scanning electron microscope (JEOL LV5910, manufactured by JEOL Ltd.) is analyzed with image analysis software (trade name: Image-Pro Plus, available from Planetron Co). Analysis is made as follows: The number of pixels per unit length is calibrated from a micron bar at the time of capturing the image. The diameter in a given direction of each of the 50 polyethylene particles randomly selected from the image is measured on the basis of the number of pixels on the image. The arithmetic mean of the resulting measurements is defined as a length-average particle size.

As a guide, the sphericity of the polyethylene particles is preferably 100 or more and 160 or less in terms of a shape factor SF1. The shape factor SF1 is an index represented by mathematical expression (1) and indicates that at a shape factor closer to 100, each of the particles has a more spherical shape. As the shape factors SF1 of the polyethylene particles, values determined by a measurement method described below may be used. The information of the image captured with the scanning electron microscope is fed to an image analyzer (trade name: Luzex 3, manufactured by Nireco Corporation). With respect to randomly selected 50 polyethylene particle images, SF1 is calculated from mathematical expres sion (1), and then the arithmetic mean of the calculated values is determined:

$$SF1=\{(MXLNG)^2/AREA\}\times(\pi/4)\times(100) \qquad (1)$$

(wherein MXLNG represents the absolute maximum length of a polyethylene particle, and AREA represents a projected area of the particle).

The specific surface area of the polyethylene particles is measured according to Japanese Industrial Standards (JIS) 28830 (2001) and is preferably 10 m²/g or less. At a specific surface area of the polyethylene particles of 10 m²/g or less, it is possible to inhibit an excessive increase in the hardness of the elastic layer when the polyethylene particles are mixed with the base polymer.

As a guide, the polyethylene particle content of the elastic layer is preferably 5% by mass or more and 50% by mass or less with respect to the elastic layer. When the polyethylene particle content of the elastic layer is 5% by mass or more and 50% by mass or less with respect to the elastic layer, it is possible to expose the polyethylene particles from the elastic layer in an amount sufficient to roughen the surface of the elastic layer and to inhibit an excessive increase in the hardness of the elastic layer.

The elastic layer preferably contains a conductive agent to adjust the electrical resistance. Examples of the conductive agent are described below.

Examples thereof include electronically conductive agents, such as carbon materials, e.g., carbon black and graphite, oxides, e.g., titanium oxide and tin oxide, metals, e.g., Cu and Ag, and electro-conductive particles made electrically conductive by covering their surfaces with oxides or metals; and ionically conductive agents, such as inorganic ionic substances, e.g., lithium perchlorate, sodium perchlorate, and calcium perchlorate, cationic surfactants, e.g., lauryltrimethylammonium chloride, stearyltrimethylammonium chloride, octadecyltrimethylammonium chloride, dodecyltrimethylammonium chloride, hexadecyltrimethylammonium chloride, trioctylpropylammonium bromide, and modified aliphatic dimethylethylammonium ethosulfate, amphoteric surfactants, e.g., lauryl betaine, stearyl betaine, and dimethylalkyllauryl betaine, quaternary ammonium salts, e.g., tetraethylammonium perchlorate, tetrabutylammonium perchlorate, and trimethyloctadecylammonium perchlorate, and lithium salts of organic acids, e.g., lithium trifluoromethanesulfonate.

These conductive agents may be used alone or in combination of two or more. The conductive agent content of the elastic layer is not particularly limited as long as it imparts desired electrical conductivity to the charging member. To reduce the thickness of the surface layer, the elastic layer preferably has low electrical resistance. The conductive agent content is preferably adjusted in such a manner that, for example, the elastic layer has an electrical resistance of $10^2 \Omega$ or more and $10^8 \Omega$ or less and more preferably $10^3 \Omega$ or more and $10^6 \Omega$ or less.

In addition, the elastic layer may optionally contain, for example, a filler, a processing agent, an age resistor, a cross-linking auxiliary agent, a cross-linking accelerator, a cross-linking accelerator activator, a cross-linking retarder, and a dispersant, which are commonly used as compounding agents, as long as the function of the foregoing substance is not inhibited.

The elastic layer preferably has an Asker-C hardness of 60 degrees or more and 85 degrees or less and more preferably 70 degrees or more and 80 degrees or less, from the viewpoint of the inhibition of the deformation of the charging member when the charging member are brought into contact with each other. The value of the Asker-C hardness may be measured by bringing an indenter of an Asker C-type durometer (manufactured by Kobunshi Keiki Co., Ltd.) into contact with a surface of a measuring object at a load of 1000 g in a measurement environment: at 25° C. and 55% RH.

As described above, the elastic layer according to the present invention holds the polyethylene particles in such a manner that some of the polyethylene particles are exposed. FIG. 1 is an enlarged, schematic cross-sectional view illustrating the vicinity of a surface of a charging member according to the present invention. In FIG. 1, exposed portions 31a of polyethylene particles 31 are not covered with an elastic layer and protrude from the elastic layer 12 in a scanning electron microscope image, so that a surface of the elastic layer is roughened. In the present invention, the surface of the elastic layer 12 is a concept including surfaces of the exposed portions 31a of the polyethylene particles 31. In the present invention, thus, a state in which the surface of the elastic layer 12 is covered with a surface layer 13 described below indicates a state in which the surface layer 13 covers the entire surface of the elastic layer including the exposed portions 31a of the polyethylene particles 31. An uneven shape reflecting the uneven shape, which is formed of the polyethylene particles 31, of the surface of the elastic layer 12 is formed on a surface of the surface layer 13, i.e., on the surface of the surface layer 13 constituting a surface of the charging member according to the present invention.

Here, the fact that the uneven shape reflecting the uneven shape of the surface of the elastic layer is formed on the surface of the surface layer indicates that projections and recesses are formed on the surface of the surface layer because of projections and recesses on the surface of the elastic layer. The projections and recesses on the surface of the elastic layer 12 need not be completely reproduced on the surface of the surface layer.

According to the present invention, a method for forming an elastic layer from which at least some of polyethylene particles are exposed will be described below.

Materials constituting the elastic layer, specifically, a binder polymer, polyethylene particles, and, optionally, electro-conductive particles, are mixed together using an internal mixer, e.g., a Banbury mixer or a pressure kneader, or an open mixer, e.g., an open roll to prepare a mixture to form the elastic layer. Thereafter, the elastic layer may be formed on the electro-conductive support by any of the following methods (1) to (3):

(1) A method in which the mixture for the elastic layer is extruded with an extruder to form a tube and then an electro-conductive support is inserted thereinto;
(2) A method in which the mixture for the elastic layer is co-extruded with an extruder equipped with a cross head to form a cylinder having a desired outer diameter, the cylinder being centered around an electro-conductive support; and
(3) A method in which the mixture for the elastic layer is injected with an injection molding machine into a metal mold having a desired outer diameter to form the elastic layer.

In particular, the method (2) is preferred because it facilitates continuous production, has a small number of steps, and is suitable for production at low cost.

Next, necessary heat curing treatment depending on properties of the base polymer is performed. The surface of the elastic layer formed on the electro-conductive support is ground to expose some of the polyethylene particles from the elastic layer. As a method for grinding the surface of the elastic layer, a traverse technique for performing grinding by moving a whetstone or an elastic roller including the elastic layer in the axial direction, a plunge-cut technique for performing grinding by rotating an elastic roller with a whetstone that is longer than the length of the elastic roller, and so forth may be employed. The plunge-cut technique has advantages that the entire length of the elastic roller can be ground in one operation and thus the processing time can be reduced, compared with the traverse technique, which is preferred. The surface state of the elastic layer has a great influence on the surface of the charging member because the surface layer formed on the surface of the elastic layer is a thin film. Thus, the elastic layer is preferably subjected to surface modification treatment, such as a reduction in friction, from the viewpoint of the stabilization of driving with the photosensitive member and the prevention of toner contamination. Examples of a method of surface modification include ultraviolet irradiation, electron beam irradiation, plasma treatment, and corona discharge treatment. These surface treatments may be employed in combination.

Surface Layer

The surface layer contains a high-molecular compound having a constitutional unit represented by formula (1) described below. The high-molecular compound exhibits excellent affinity for both the polyethylene particles and the binder polymer constituting the surface of the elastic layer. The high-molecular compound also has a dense crosslinked structure and thus exhibits high stiffness.

The detachment of the polyethylene particles partially exposed from the elastic layer is thus effectively inhibited from the charging member. As a result, the charging member according to the present invention has a surface shape that is not easily changed even by long-term use. That is, the charging member according to the present invention has charging performance that is not easily changed with time.

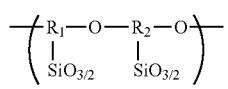
(1)

wherein in formula (1), $R_1$ and $R_2$ each independently represent formulae (2) to (5).

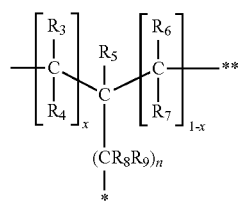
(2)

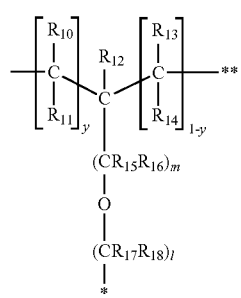
(3)

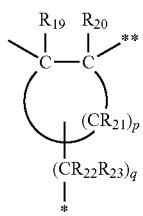
(4)

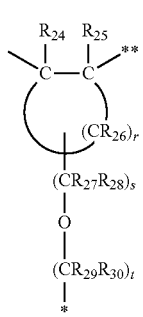
(5)

In formulae (2) to (5), $R_3$ to $R_3$, $R_{10}$ to $R_{14}$, $R_{19}$, $R_{20}$, $R_{24}$, and $R_{25}$ each independently represent hydrogen, an alkyl group having 1 to 4 carbon atoms, a hydroxy group, a carboxyl group, or an amino group. $R_8$, $R_9$, $R_{15}$ to $R_{18}$, $R_{22}$, $R_{23}$, and $R_{27}$ to $R_{30}$ each independently represent hydrogen or an alkyl group having 1 to 4 carbon atoms. n, m, l, q, s, and t each independently represent an integer of 1 to 8. p and r each independently represent an integer of 4 to 12. x and y each independently represent 0 or 1. Each of the symbols "*" represents a binding site to a corresponding one of the silicon atoms in formula (1). Each of the symbols "**" represents a binding site to a corresponding one of the oxygen atoms in formula (1).

Specific examples of the structures represented by the formulae (2) to (5) include structures represented by formulae (6) to (9) in which $R_3$ to $R_{30}$ in formulae (2) to (5) represent hydrogen atoms.

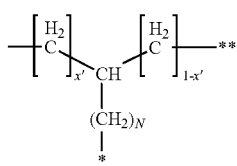
(6)

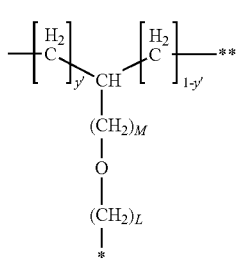
(7)

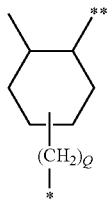

(8)

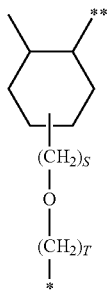

(9)

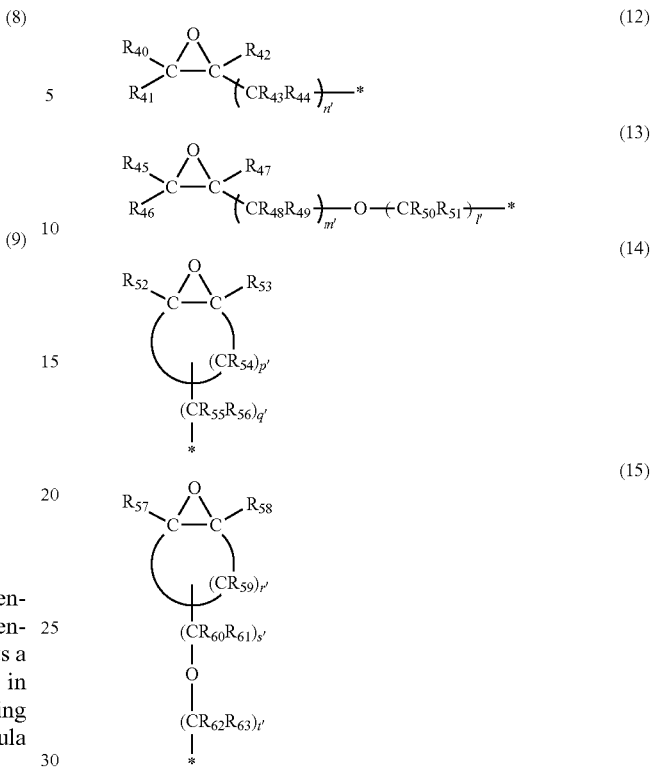

In formulae (6) to (9), N, M, L, Q, S, and T each independently represent an integer of 1 to 8. x' and y' each independently represent 0 or 1. Each of the symbols "*" represents a binding site to a corresponding one of the silicon atoms in formula (1). Each of the symbols "**" represents a binding site to a corresponding one of the oxygen atoms in formula (1).

The surface layer may be formed by a method including preparing a coating liquid for the formation of the surface layer, applying the coating liquid onto the elastic layer having exposed portions of the polyethylene particles to form a coating film, and irradiating the coating film with activation energy rays to form cross-links. The coating liquid for the surface layer may be prepared by steps (1) and (2) described below.

Step (1)

A step of mixing an epoxy group-containing hydrolyzable silane compound (A) represented by formula (10), optionally mixed with a hydrolyzable silane compound (B) represented by formula (11), water (D), and an alcohol (E) together and performing hydrolysis and condensation by heating to reflux:

$$R_{31}\text{—Si}(OR_{32})(OR_{33})(OR_{34}) \quad \text{formula (10)}$$

$$R_{63}\text{—Si}(OR_{64})(OR_{65})(OR_{66}) \quad \text{formula (11)}$$

Step (2)

A step of adding photopolymerization initiator (F) to the resulting hydrolyzed condensate prepared by step (1) and optionally diluting the product with the alcohol (E) to an appropriate concentration.

In the epoxy group-containing hydrolyzable silane compound (A) represented by formula (10) used in step (1), $R_{32}$ to $R_{34}$ each independently represent a hydrocarbon group. Examples of the hydrocarbon group include an alkyl group, an alkenyl group, and aryl group. Among these groups, a linear or branched alkyl group having 1 to 4 carbon atoms is preferred. Specific examples thereof include a methyl group, an ethyl group, a n-propyl group, an i-propyl group, a n-butyl group, and a t-butyl group. $R_{31}$ is represented by any one of formulae (12) to (15) containing epoxy groups.

In formulae (12) to (15), $R_{40}$ to $R_{42}$, $R_{45}$ to $R_{47}$, $R_{52}$, $R_{53}$, $R_{57}$, and $R_{58}$ each independently represent hydrogen, an alkyl group having 1 to 4 carbon atoms, a hydroxy group, a carboxyl group, or an amino group. $R_{43}$, $R_{44}$, $R_{48}$ to $R_{51}$, $R_{55}$, $R_{56}$, and $R_{60}$ to $R_{63}$ each independently represent hydrogen or an alkyl group having 1 to 4 carbon atoms. $R_{54}$ and $R_{59}$ each independently represent hydrogen, an alkoxy group having 1 to 4 carbon atoms, or an alkyl group having 1 to 4 carbon atoms. n', m', l', q', s', and t' each independently represent an integer of 1 to 8. p' and r' each independently represent an integer of 4 to 12. Each of the symbols "*" represents a binding site to the silicon atom in formula (10) described above.

Specific examples of the epoxy group-containing hydrolyzable silane compound (A) are described below. These compounds may be used alone or in combination of two or more. Examples thereof include 4-(trimethoxysilyl)butane-1,2-epoxide, 5,6-epoxyhexyltriethoxysilane, 8-oxiran-2-yloctyltrimethoxysilane, 8-oxiran-2-yloctyltriethoxysilane, 3-glycidoxypropyltrimethoxysilane, 3-glycidoxypropyltriethoxysilane, 1-(2-triethoxysilyl)methyl)cyclohexane-3,4-epoxide, 1-(2-triethoxysilyl)ethyl)cyclohexane-3,4-epoxide, and 3-(3,4-epoxycyclohexyl)methyloxypropyltrimethoxysilane.

In the hydrolyzable silane compound (B) represented by formula (11) used in step (1), $R_{64}$ represents an alkyl group or an aryl group. $R_{65}$ to $R_{67}$ each independently represent a hydrocarbon group. The alkyl group represented by $R_{64}$ is preferably a linear alkyl group having 1 to 21 carbon atoms and more preferably a linear alkyl group having 6 to 10 carbon atoms. The aryl group represented by $R_{64}$ is preferably a phenyl group. Examples of the hydrocarbon groups represented by $R_{65}$ to $R_{67}$ include an alkyl group, an alkenyl group, or an aryl group.

Among these groups, a linear or branched alkyl group having 1 to 4 carbon atoms is preferred. Specific examples thereof include a methyl group, an ethyl group, a n-propyl group, an i-propyl group, a n-butyl group, and a t-butyl group. In the case where a hydrolyzable silane compound in which $R_{64}$ contains a phenyl group is contained, a combined use of a hydrolyzable silane compound in which $R_{64}$ contains a linear alkyl group having 6 to 10 carbon atoms is preferred because of their good compatibility with a solvent even when the structure is changed through a hydrolysis-condensation reaction.

Specific examples of the hydrolyzable silane compound (B) are described below.

Examples thereof include methyltrimethoxysilane, methyltriethoxysilane, ethyltrimethoxysilane, ethyltriethoxysilane, propyltrimethoxysilane, propyltriethoxysilane, hexyltrimethoxysilane, hexyltriethoxysilane, hexyltripropoxysilane, decyltrimethoxysilane, decyltriethoxysilane, phenyltrimethoxysilane, phenyltriethoxysilane, phenyltripropoxysilane, and octyltriethoxysilane.

As the hydrolyzable silane compound (B), two or more compounds selected from the compounds listed in the foregoing specific examples may be used in combination. A compound in which at least one hydrogen atom of the alkyl group of each of the compounds listed in the foregoing specific examples is substituted with a fluorine atom may also be used as the hydrolyzable silane compound (B).

With respect to the amount of the water (D) added in step (1), the ratio of the number of moles of the water, (D), to the total number of moles of the hydrolyzable silane compounds (A) and (B), (A)+(B), i.e., $R_{OR}=(D)/((A)+(B))$, is preferably 0.1 or more and 6.0 or less. More preferably, $R_{OR}$ is 1.2 or more and 3.0 or less. When $R_{OR}$ is 0.1 or more, the condensation reaction is sufficiently conducted to suppress any remaining unreacted silica compound in the coating liquid, thereby providing a film having a high crosslink density. When $R_{OR}$ is 6.0 or less, the rate of the condensation reaction is high, resulting in the inhibition of clouding and the formation of precipitation. Furthermore, a reduction in compatibility with the condensation product due to high polarity can be inhibited.

The alcohol (E) is used to compatibilize the hydrolyzed condensates of the hydrolyzable silane compounds (A) and (B). As the alcohol (E), it is preferable to use a primary alcohol, a secondary alcohol, a tertiary alcohol, a mixed system of a primary alcohol and a secondary alcohol, or a mixed system of a primary alcohol and a tertiary alcohol. As the alcohol, ethanol, a mixed solution of methanol and 2-butanol, or a mixed solution of ethanol and 2-butanol is particularly preferred.

In step (1), these are mixed and heated to reflux to form a hydrolyzed condensate. In step (1), one or two or more hydrolyzable silane compounds (A) may be used in combination with one or two or more hydrolyzable silane compounds (B), as needed.

As a second-step reaction, a metal alkoxide (C), the water (D), and the alcohol (E) are added thereto, and then the mixture is stirred. Here, the metal alkoxide (C) are preferably titanium, zirconium, or hafnium to which the number of alkoxy groups corresponding to the valence is bonded. A surface layer formed using a coating liquid for a surface layer, the coating liquid being prepared by the addition of the metal alkoxide, has a higher stiffness. The reason for this is presumably that a high-molecular compound constituting the resulting surface layer has a denser crosslinked structure because the metal alkoxide has a valence of four or more.

Examples of the alkoxy group include alkyloxy groups, alkenyloxy groups, and aryloxy groups, in which the carbon atoms may be partially substituted with oxygen or nitrogen. Specific examples thereof include a methoxy group, an ethoxy group, a n-propoxy group, an i-propoxy group, a n-butoxy group, and t-butoxy group. Preferably, the amount of the metal alkoxide (C) used is such that $(C)/((A)+(B)) \leq 10.0$, on a molar ratio basis, because clouding and the formation of precipitation in the surface layer are inhibited and the shelf life of the coating liquid is improved.

More preferably, $0.5 \leq (C)/((A)+(B)) \leq 3.0$.

The metal alkoxide (C) is preferably added to a hydrolyzed condensate prepared by adding the water (D) and the alcohol (E) to the epoxy group-containing hydrolyzable silane compound (A) or a mixture of the epoxy group-containing hydrolyzable silane compound (A) and the hydrolyzable silane compound (B).

The photopolymerization initiator (F) used in step (2) is used to form crosslinks in a silane condensation product. As the photopolymerization initiator (F), an onium salt of Lewis acid or Bronsted acid, or a cationic polymerization catalyst may be used. Examples of the cationic polymerization catalyst include borate salts, imide compounds, triazine compounds, azo compounds, and peroxides. As the cationic polymerization catalyst, an aromatic sulfonium salt or an aromatic iodonium salt is preferred from the viewpoint of sensitivity, stability, and reactivity. Particularly preferable examples of the cationic polymerization catalyst include bis(4-tert-butylphenyl)iodonium salts and a compound represented by formula (16) (trade name: Adecaoptomer SP150, manufactured by Asahi Denka Kogyo K.K.).

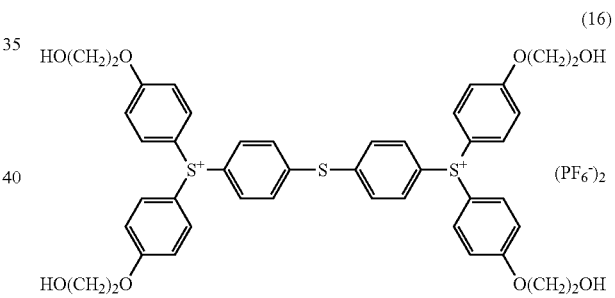

(16)

A compound represented by formula (17) (trade name: Irgacure 261, manufactured by Ciba Specialty Chemicals Inc.) may also preferably be used.

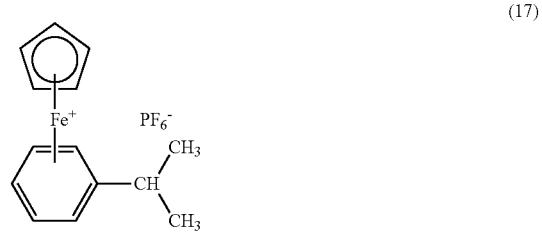

(17)

Preferably, the photopolymerization initiator (F) is dissolved in a solvent, such as alcohol or ketone, e.g., methanol or methyl isobutyl ketone, before use in order to improve the compatibility with the coating liquid for a surface layer.

To improve the coating properties, the coating liquid for a surface layer is preferably adjusted so as to have a concentration suitable for application. A lower viscosity of the coating liquid for a surface layer results in a smaller thickness of the surface layer, thereby increasing the capacitance of the surface layer. It is thus possible to sufficiently ensure the amount of charge on the surface of the charging member, inhibit nonuniform discharge, and uniformly charge the photosensitive member. Hence, preferably, the coating liquid is appropriately diluted with a solvent so as to have a low viscosity.

In this case, more preferably, the viscosity of the coating liquid is 2 mPa·s or less when measured with a Brookfield type viscometer. As the solvent used, an alcohol the same as the alcohol used in step (1) may also be used. Furthermore, a ketone, for example, ethyl acetate, methyl ethyl ketone, or methyl isobutyl ketone may be used. They may also be used in combination as a mixture. Among these solvents, methanol is particularly preferred. As a method for applying the thus-prepared coating liquid for a surface layer onto the elastic layer, for example, dip coating, spray coating, ring coating, or coating with a roll coater may be employed.

A coating film formed on the elastic layer by the foregoing method is irradiated with activation energy rays to produce radicals of the photopolymerization initiator (F), thereby causing cleavage and polymerization of the epoxy group to form crosslinks. As the activation energy rays, ultraviolet light is preferred because it can produce the radicals of the photopolymerization initiator (F) to allow the crosslinking reaction to proceed at a low temperature. The progress of the crosslinking reaction at a low temperature inhibits rapid evaporation of the solvent from the coating film and thus inhibits the occurrence of phase separation or the formation of a wrinkle in the coating film, thereby resulting in the formation of the surface layer having high adhesion strength to the elastic layer. The surface layer having high adhesion strength to the elastic layer inhibits the formation of a wrinkle or crack even if the charging member is used in an environment in which the temperature and humidity are rapidly changed and the volume of the elastic layer varies in response to the changes in temperature and humidity. Furthermore, the thermal degradation of the elastic layer can be inhibited during the progress of the crosslinking reaction, thereby inhibiting the degradation of the electrical properties of the elastic layer in the production process.

Examples of an ultraviolet-ray source that may be used include high-pressure mercury lamps, metal halide lamps, low-pressure mercury lamps, and excimer UV lamps. Among these lamps, a lamp that emits ultraviolet light having a wavelength of 150 nm or more and 480 nm or less is preferred. The ultraviolet irradiation may be performed while the amount supplied is adjusted, depending on the irradiation time, the lamp output, and the distance between the lamp and the surface layer. A gradient of the amount of ultraviolet irradiation may be made. The accumulated amount of ultraviolet light is preferably about 8000 mJ/cm$^2$. The accumulated amount of ultraviolet light may be determined from the following expression:

$$\text{Accumulated amount of ultraviolet light [mJ/cm}^2\text{]} = \text{ultraviolet light intensity [mW/cm}^2\text{]} \times \text{irradiation time [s]}$$

In the case where a low-pressure mercury lamp is used, the accumulated amount of ultraviolet light may be measured with an accumulated UV meter (trade name: UIT-150-A or UVD-S254, manufactured by Ushio Inc). In the case where an excimer UV lamp is used, the accumulated amount of ultraviolet light may be measured with an accumulated UV meter (trade name: UIT-150-A or VUV-S172, manufactured by Ushio Inc).

The surface layer according to the present invention covers the entire surface of the elastic layer including the exposed portions of the polyethylene particles. The elastic layer has a thickness smaller than the height of the exposed portions of the polyethylene particles. This allows the surface shape of the elastic layer to be reflected in the surface shape of the surface layer, i.e., the surface shape of the charging member. Here, the ten-point height of irregularities (Rzjis) of the charging member according to the present invention is preferably in the range of 5 to 30 μm and particularly 9 to 20 μm. This inhibits the adhesion of toner and so forth to the surface of the charging member to further stabilize the charging performance.

The thickness of the surface layer is not particularly limited as long as the surface shape of the elastic layer is reflected in the surface shape of the charging member. As a guide, the surface layer preferably has a thickness of 1 nm or more and 1 μm or less and particularly 5 nm or more and 500 nm or less. A thickness falling within this range results in the effective inhibition of the detachment of the polyethylene particles from the charging member during operation. It is also possible to suppress the deformation of the surface layer and inhibit an increase in the area of contact with the photosensitive member. At a thickness of the surface layer of 1 μm or less, the surface layer has appropriate capacitance, and an excessive increase in the hardness of the charging member is inhibited, thereby resulting in an appropriate nip between the charging member and the photosensitive member. The thickness of the surface layer may be measured by observation with an electron microscope.

The charging member according to the present invention effectively inhibits the adhesion of toner and so forth to the surface of the electrophotographic photosensitive member and serves to form high-quality electrophotographic images over a long period of time.

According to studies conducted by the inventors, when the charging member according to the foregoing PTL 2 is used for a long term, defects may occur in electrophotographic images. While the cause thereof is still being elucidated, it is speculated that the defects are attributed to a mechanism as described below. That is, the surface layer containing a polysiloxane according to PTL 2 is dense and has high hardness. Thus, at a nip between the charging member and the photosensitive member, toner at the nip is pressed against a surface of the photosensitive member, so that the toner adhering to the surface of the photosensitive member accumulates gradually. Then the toner adherent to the surface of the photosensitive member becomes less able to be removed with a cleaning blade. As a result, the defects occur in electrophotographic images.

In contrast, the charging member according to the present invention has the surface shape reflecting the shape of the surface of the elastic layer roughened by the polyethylene particles. The polyethylene particles are used as the particles for the formation of the roughened surface, and the surface layer containing high-stiffness polysiloxane is used. Thus, the shape of the roughened surface of the charging member is not easily deformed even at the nip between the charging member and the photosensitive member. In other words, the area of contact between the charging member and the photosensitive member at the nip is relatively small, compared with the case where the charging member according to PTL 2 is used.

Thus, the toner is less likely to adhere to the surface of the photosensitive member, suppressing the degradation of the cleaning properties of the surface of the photosensitive member with time. As a result, it is possible to inhibit the occurrence of an image defect due to adherents on the surface of the photosensitive member even when a large number of electrophotographic images are formed.

The surface layer preferably has a volume resistivity of $10^8$ Ω·cm or more and $10^{15}$ Ω·cm or less and particularly $10^{10}$ Ω·cm or more and $10^{15}$ Ω·cm or less. When the surface layer has a volume resistivity falling within the range described above, it is possible to effectively inhibit the occurrence of abnormal discharge between the charging member and the photosensitive member. Furthermore, the photosensitive member can be more uniformly charged.

The surface layer preferably has an elastic modulus of 1,000 MPa or more and 20,000 MPa or less. When the surface layer has an elastic modulus falling within the range described above, it is possible to form the nip having an appropriate width between the charging member and the photosensitive member. Furthermore, it is possible to inhibit the deformation such that the polyethylene particles are embedded. It is also possible to inhibit an excessive increase in the area of contact with the photosensitive member. Moreover, even when the surface layer has a thickness described above, the surface layer can follow the deformation of the flexible elastic layer.

Figure 2:
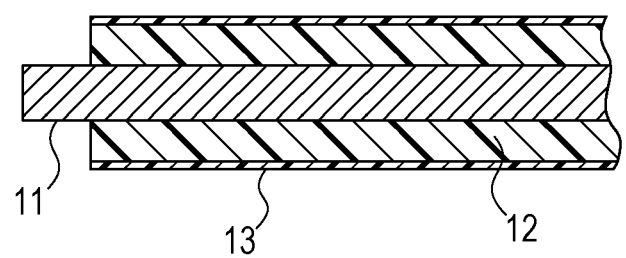
FIG. 2 is a cross-sectional view illustrating an example of a charging member of the present invention.

The charging member of the present invention is not particularly limited as long as it includes the elastic layer and the surface layer on the electro-conductive support. The charging member may include additional layers between the electro-conductive support and the elastic layer and between the elastic layer and the surface layer. As an example of the charging member of the present invention, a roller-shaped charging member is illustrated in a cross-sectional view of FIG. 2. A charging roller 11 has a structure in which the elastic layer 12 and the surface layer 13 are stacked, in that order, on an electro-conductive support 11.

Electrophotographic Apparatus

Figure 3:
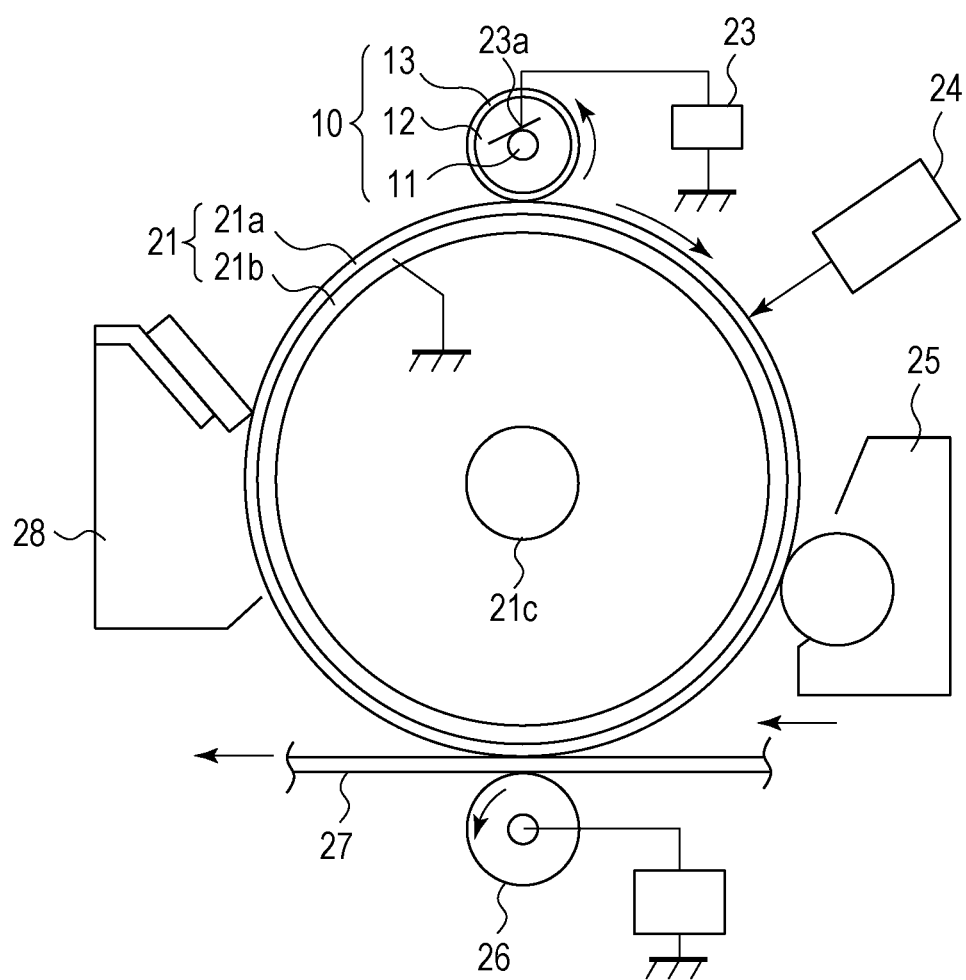
FIG. 3 is a schematic configuration diagram illustrating an example of an electrophotographic apparatus including a charging member of the present invention.

An example of an electrophotographic apparatus including a charging member of the present invention is illustrated in FIG. 3. In FIG. 3, reference numeral 21 denotes a cylindrical photosensitive member (hereinafter, referred to as a "photosensitive member"). The photosensitive member 21 includes a support 21b and a photosensitive layer 21a formed on the support and is rotatably driven around a shaft 21c in the direction indicated by an arrow at a predetermined peripheral speed. The charging roller 10 is arranged so as to be pressed against the surface of the photosensitive member 21 rotatably driven and so as to be driven by the photosensitive member in contact with the charging roller. A predetermined direct-current (DC) bias is applied from a power source 23 connected to the electro-conductive support 11 to the charging roller 10 through a sliding electrode 23a. The photosensitive member that is pressed to form a nip is charged to a predetermined potential in the vicinity of the nip. The photosensitive member is exposed to exposure light emitted from an exposure means 24, for example, slit exposure or laser beam scanning exposure, to form an electrostatic latent image corresponding to a target image on the photosensitive layer 21a of the photosensitive member. A toner is fed from a developing member 25 to the electrostatic latent image formed on the photosensitive layer, thereby forming a toner image. The toner image on the photosensitive member is successively transferred onto a transfer material 27, such as paper, conveyed from a transfer material feed means (not illustrated) to a contact portion between the photosensitive member and a transfer means 26 in synchronization with the rotation of the photosensitive member. The transfer material to which the toner image has been transferred is separated from the surface of the photosensitive member, is guided into a fixing means to fix the image, and ejected as an image-formed material (a print or copy) from the apparatus. After the transfer of the toner image, the surface of the photosensitive member is cleaned by removing the developer (toner) left after the transfer with a cleaning means 28 equipped with a cleaning blade formed of an elastic body or the like.

The charging member of the present invention includes the elastic layer that contains high-hardness polyethylene particles having a high molecular weight in such a manner that some of the polyethylene particles are exposed. The charging member has the roughened surface by the particles through the thin surface layer. The surface layer has high adhesion to both the particles and the elastic layer and has a high elastic modulus. Thus, the entire surface of the elastic layer is covered to hold the particles. It is possible to maintain a state in which the particles are exposed at the surface of the elastic layer at the nip formed when the charging member is pressed against the photosensitive member. This maintains the uneven shape of the surface of the charging member and inhibits an increase in the area of contact between the charging member and the photosensitive member. The surface layer is formed of a thin film. The charging member can maintain the low hardness of the elastic layer and can form a sufficient nip between the charging member and the photosensitive member. It is possible to inhibit the occurrence of image failure due to faulty contact and inhibit the occurrence of long-term image failure due to adhesion of the toner and external additives to the surface of the charging member.

EXAMPLES

The present invention will be described in more detail below by specific examples. "Part(s)" described below indicates "part(s) by mass". With respect to reagents and so forth, commercially available high-purity products were used unless otherwise specified.

Example 1

Formation of Conductive Elastic Layer

Materials described in Table 1 below were mixed together with a 6-liter pressure kneader (trade name: TD6-15MDX, manufactured by Toshin Co., Ltd.) at a filling factor of 70 vol % and a blade rotation speed of 30 rpm for 16 minutes to provide an A-stage kneaded rubber composition.

TABLE 1

| | |
|---|---|
| NBR (trade name: N230SV, manufactured by JSR Corp.) | 100 parts by mass |
| Zinc oxide | 5 parts by mass |
| Zinc stearate | 1 part by mass |
| Calcium carbonate (trade name: NANOX #30, manufactured by Maruo Calcium Co., Ltd.) | 20 parts by mass |
| Carbon black (trade name: Raven #1170, manufactured by Columbian Carbon) | 26 parts by mass |
| High-molecular-weight polyethylene particles 1 (trade name: XM-221U, manufactured by Mitsui Chemicals, Inc., average particle size: 30 μm) | 20 parts by mass |

Next, materials described in Table 2 below were mixed together by cutting the right and left portions 20 times in total with an open roll having a roll diameter of 12 inches at a front-roll rotation speed of 8 rpm, a rear-roll rotation speed of 10 rpm, and a roll gap of 2 mm. Thereafter, the roll gap was changed to 0.5 mm. The resulting mixture was subjected to tight milling 10 times to give an unvulcanized rubber composition for the formation of an elastic layer.

TABLE 2

| | |
|---|---|
| A-stage kneaded rubber composition prepared above | 172 parts by mass |
| Tetrabenzylthiuram disulfide (trade name: Sanceler-TBzTD, manufactured by Sanshin Chemical Industry Co., Ltd.) | 4.5 parts by mass |
| Sulfur | 1.2 parts by mass |

A conductive vulcanization adhesive (METALOC U-20, available from Toyokagaku Kenkyusho Co., Ltd.) was applied to a 226-mm-long middle portion in the axial direction of a columnar surface of a columnar electro-conductive support (composed of steel and having a nickel-plated surface) having a diameter of 6 mm and a length of 252 mm, followed by drying at 80° C. for 30 minutes. Next, the foregoing unvulcanized rubber composition was extruded together with the electro-conductive support while being shaped coaxially around the electro-conductive support and in the form of a cylinder, by extrusion using a crosshead, thereby producing an unvulcanized rubber roller having a diameter of 8.8 mm, the unvulcanized rubber roller being coated with the unvulcanized rubber composition on the outer periphery of the electro-conductive support. An extruder having a cylinder diameter of 45 mm (Φ45) and an L/D of 20 was used. The temperature during extrusion was controlled as follows: 80° C. for a head, 110° C. for a cylinder, and 110° C. for a screw. Both ends of the shaped unvulcanized rubber roller were cut in such a manner that the elastic layer portion had a width of 228 mm in the axial direction. Thereafter, the cut roller was subjected to heat treatment at 160° C. for 60 minutes in an electric furnace to provide a vulcanized rubber roller. A surface of the resulting vulcanized rubber roller was ground with a grinder using a plunge-cut grinding technique to provide a conductive elastic layer 1 having an elastic layer with a crown shape, the elastic layer having an end-portion diameter of 8.40 mm and a middle-portion diameter of 8.50 mm.
Formation of Surface Layer Materials described in Table 3 below were mixed together. The mixture was stirred at room temperature and then heated to reflux for 24 hours to give a sol of condensate 1 of an organic-inorganic hybrid sol.

TABLE 3

| | |
|---|---|
| Glycidoxypropyltriethoxysilane (GPTES) | 42.31 g (179.3 mmol) |
| Hexyltriethoxysilane (HeTES) | 37.00 g (179.3 mmol) |
| Water | 11.62 g |
| Ethanol | 103.96 g |

This sol of condensate 1 was added to a 2-butanol/ethanol mixed solvent to prepare a sol fluid of condensate 1 having a solid content of 7% by mass. Incidentally, the solid content is a condensation product formed when the hydrolyzable silane compound is completely subjected to dehydration condensation. Hereinafter, the solid content is used in the same meaning unless otherwise specified.

To 100 g of the sol fluid of condensate 1, an aromatic sulfonium salt (trade name: ADECAOPTOMER SP-150, manufactured by Asahi Denka Kogyo K.K.) as a cationic photopolymerization initiator was added in a proportion of 0.35 g to prepare a coating stock solution 1.

The coating stock solution 1 was diluted with a 2-butanol/ethanol mixed solvent so as to have a solid content of 1.0% by mass, thereby preparing a surface layer-forming coating solution 1. The viscosity of the surface layer-forming coating solution 1 was measured with a Brookfield type viscometer (RE500L, manufactured by Toki Sangyo Co., Ltd., using 0.8°×R24 cone rotor) and found to be 1 mPa·s or less. The measurement conditions include a measurement temperature of 25° C. and an amount of sample of 0.6 ml.

Next, the surface layer-forming coating solution 1 was applied onto the elastic layer of the rubber roller by ring coating (ejection rate: 0.120 mL/s, moving rate of ring head: 85 mm/s, and total delivery: 0.130 mL).

Next, the rubber roller on which a coating film of the surface layer forming coating solution 1 was formed was irradiated with ultraviolet light using a low-pressure mercury lamp (manufactured by Harison Toshiba Lighting Corporation) while being rotated in such a manner that the amount of ultraviolet light was 8000 mJ/cm$^2$ as sensitivity in a 254 nm sensor, thereby curing the coating film. In this way, a charging roller 1 including the surface of the elastic layer covered with a surface layer which reflects the surface shape of the elastic layer and which has an uneven surface shape was produced. The charging roller 1 was subjected to image evaluation described below.
Image Evaluation A laser beam printer (trade name: LASER JET P1005, manufactured by Hewlett-Packard Co.) practicable for A4-size sheet lengthwise printing was prepared as an electrophotographic apparatus used in image formation. The charging roller 1 produced as above was arranged in a process cartridge for the laser beam printer. The process cartridge was mounted to the electrophotographic apparatus.

A DC voltage of −1200 V was applied to the electro-conductive support of the charging roller from an external power source (trade name: MODEL PM04015A, manufactured by Trek Japan Co., Ltd.). In an environment in which the temperature was 23° C. and the relative humidity was 50%, halftone images partially having solid images (images in which lines each having a width of 1 dot were drawn at intervals of 2 dots in the direction perpendicular to the rotational direction of an electrophotographic photosensitive member) were formed on one sheet. Subsequently, electrophotographic images each having a print density of 1% were formed on 2500 sheets. Then the same halftone images partially having solid images as those for the first sheet were formed on one sheet. Here, the images were formed in what is called an intermittent mode in which the photosensitive drum was completely stopped for each printing on one sheet.
Evaluation 1: Evaluation of Presence or Absence of Image Defect Due to Faulty Cleaning of Surface of Photosensitive Member Regarding the first sheet to 1000th sheets in the 2500 electrophotographic image sheets having a print density of 1%, the images were visually observed and were evaluated according to criteria described in Table 4 below.

TABLE 4

| Evaluation rank | Evaluation criteria |
|---|---|
| A | An image defect due to faulty cleaning of the surface of the photosensitive member is not observed on all the 1000 sheets of the electrophotographic images. |

TABLE 4-continued

| Evaluation rank | Evaluation criteria |
| --- | --- |
| B | Minor image defects due to faulty cleaning of the surface of the photosensitive member are observed, and the rate of defects occurring on every 100 sheets is always 5% or less. |
| C | Image defects due to faulty cleaning of the surface of the photosensitive member are observed, and the rate of defects occurring on every 100 sheets is always 5% or less. |
| D | Image defects due to faulty cleaning of the surface of the photosensitive member are observed, and the rate of defects occurring on every 100 sheets is more than 5% in some cases. |

Evaluation 2: Evaluation of Charging Performance

The halftone images partially having solid images formed on the first sheet and the 2501st sheet were visually observed. The presence or absence of an image defect due to nonuniform charging and the level of the defect were evaluated according to criteria described in Table 5 below.

TABLE 5

| Evaluation rank | Evaluation criteria |
| --- | --- |
| A | Nonuniformity in density in the form of a streak due to nonuniform charging is not observed or is little observed. |
| B | Nonuniformity in density in the form of a streak due to nonuniform charging is observed in the halftone image areas. |
| C | Nonuniformity in density in the form of a streak due to nonuniform charging is clearly observed in the halftone image areas and solid image areas. |

Measurement 1: Measurement of Elastic Modulus of Surface Layer

To measure the elastic modulus of the charging roller 1, the following experiment was performed. Specifically, the surface layer-forming coating solution 1 used to form the surface layer of the charging roller 1 was applied to a degreased surface of an aluminum sheet having a thickness of 100 μm and dried to form a coating film. The coating film was cured by ultraviolet irradiation (wavelength: 254 nm) such that the accumulated amount of light was 8000 mJ/cm$^2$, thereby producing a cured film having a thickness of 10 μm.

Regarding the resulting cured film, when an indenter was penetrated from a surface of the cured film at a rate of 1 μm per 7 seconds using a surface film physical property tester (trade name: FISCHER SCOPE H100V, manufactured by Fischer Instruments K.K.), the value of load on the indenter was measured and defined as the elastic modulus.

On this occasion, the fact that the structure represented by formula (1) was included in the cured film was confirmed.

Measurement 2: Measurement of Thickness of Surface Layer

The surface layer of the charging roller 1 was cut out. The thickness of the surface layer was measured on the basis of a cross section of the surface layer with a scanning transmission electron microscope (trade name: HD-2000, manufactured by Hitachi High-Technologies Corporation).

Measurement 3: Measurement of Surface Roughness of Charging Member

The ten-point height of irregularities (Rzjis1994) of the surface of the charging roller 1 was measured. The ten-point height of irregularities (Rzjis1994) was measured according to JIS B0601 (1994). The measurement conditions include an evaluation length of 8.0 mm, a cut-off value of 0.8 mm, a feed rate of 0.5 mm/s, and a filter property of 2CR.

The results of the image evaluation (Evaluation 1 and Evaluation 2) and the results of Measurement 1 to Measurement 3 are described in Table 8.

Example 2

The coating stock solution 1 prepared in the same way as in Example 1 was diluted with a 2-butanol/ethanol mixed solvent so as to have a solid content of 0.1% by mass, thereby preparing a surface layer-forming coating solution 2. A charging roller 2 was produced in the same way as in Example 1, except that the surface layer-forming coating solution 2 was used. The evaluations and the measurements on the charging roller 2 and a surface layer thereof were made in the same way as in Example 1.

Example 3

The coating stock solution 1 prepared in the same way as in Example 1 was diluted with a 2-butanol/ethanol mixed solvent so as to have a solid content of 2.0% by mass, thereby preparing a surface layer-forming coating solution 3. A charging roller 3 was produced in the same way as in Example 1, except that the surface layer-forming coating solution 3 was used. The evaluations and the measurements on the charging roller 3 and a surface layer thereof were made in the same way as in Example 1.

Example 4

The coating stock solution 1 prepared in the same way as in Example 1 was diluted with a 2-butanol/ethanol mixed solvent so as to have a solid content of 7.0% by mass, thereby preparing a surface layer-forming coating solution 4. A charging roller 4 was produced in the same way as in Example 1, except that the surface layer-forming coating solution 4 was used. The evaluations and the measurements on the charging roller 4 and a surface layer thereof were made in the same way as in Example 1.

Example 5

A charging roller 5 was produced as in Example 1, except that the amount of the polyethylene particles used for the elastic layer was 10 parts by mass. The evaluations and the measurements on this charging roller and a surface layer thereof were made in the same way as in Example 1.

Example 6

A charging roller 6 was produced as in Example 1, except that the amount of the polyethylene particles used for the elastic layer was 30 parts by mass. The evaluations and the measurements on this charging roller and a surface layer thereof were made in the same way as in Example 1.

Example 7

A charging roller 7 was produced as in Example 1, except that the amount of the polyethylene particles used for the elastic layer was 5 parts by mass. The evaluations and the measurements on this charging roller and a surface layer thereof were made in the same way as in Example 1.

Example 8

A charging roller 8 was produced as in Example 1, except that the amount of the polyethylene particles used for the elastic layer was 3 parts by mass. The evaluations and the measurements on this charging roller and a surface layer thereof were made in the same way as in Example 1.

Example 9

A charging roller 9 was produced as in Example 1, except that the amount of the polyethylene particles used for the elastic layer was 35 parts by mass. The evaluations and the measurements on this charging roller and a surface layer thereof were made in the same way as in Example 1.

Example 10

A charging roller 10 was produced as in Example 1, except that the polyethylene particles used for the elastic layer were replaced with high-molecular-weight polyethylene particles 2 (trade name: PM-200, manufactured by Mitsui Chemicals, Inc., average particle size: 10 μm). The evaluations and the measurements on this charging roller and a surface layer thereof were made in the same way as in Example 1.

Example 11

A charging roller 11 was produced as in Example 10, except that the amount of the polyethylene particles used for the elastic layer was 10 parts by mass. The evaluations and the measurements on this charging roller and a surface layer thereof were made in the same way as in Example 1.

Example 12

A charging roller 12 was produced as in Example 10, except that the amount of the polyethylene particles used for the elastic layer was 30 parts by mass. The evaluations and the measurements on this charging roller and a surface layer thereof were made in the same way as in Example 1.

Example 13

A charging roller 13 was produced as in Example 1, except that the polyethylene particles were replaced with 10 parts by mass of the high-molecular-weight polyethylene particles 1 and 10 parts by mass of the high-molecular-weight polyethylene particles 2, i.e., 20 parts by mass in total. The evaluations and the measurements on this charging roller and a surface layer thereof were made in the same way as in Example 1.

Example 14

A charging roller 14 was produced as in Example 1, except that the polyethylene particles were replaced with 15 parts by mass of the high-molecular-weight polyethylene particles 1 and 15 parts by mass of the high-molecular-weight polyethylene particles 2, i.e., 30 parts by mass in total. The evaluations and the measurements on this charging roller and a surface layer thereof were made in the same way as in Example 1.

Example 15

A charging roller 15 was produced as in Example 1, except that the polyethylene particles were replaced with 5 parts by mass of the high-molecular-weight polyethylene particles 1 and 10 parts by mass of the high-molecular-weight polyethylene particles 2, i.e., 15 parts by mass in total. The evaluations and the measurements on the charging roller 15 and a surface layer thereof were made in the same way as in Example 1.

Example 16

A surface layer-forming coating solution was prepared as described below.

Materials described in Table 6 below were mixed together. The mixture was stirred at room temperature for 30 minutes and then heated to reflux at 120° C. for 20 hours with an oil bath to prepare a sol of condensate 2 having a solid content of 28.0% by mass.

TABLE 6

| Glycidoxypropyltriethoxysilane (GPTES) | 10.74 g (45.5 mmol) |
| Hexyltriethoxysilane (HeTES) | 57.68 g (279.5 mmol) |
| Water | 10.53 g |
| Ethanol | 85.30 g |

A coating stock solution 2 and a charging roller 16 were produced as in Example 13, except that the sol of condensate 2 was used. The evaluations and the measurements on the charging roller 16 and a surface layer thereof were made in the same way as in Example 1.

Example 17

A surface layer-forming coating solution was prepared as described below.

Materials described in Table 7 below were mixed together. The mixture was stirred at room temperature for 30 minutes and then heated to reflux at 120° C. for 20 hours with an oil bath to prepare a sol of condensate 3 having a solid content of 28.0% by mass.

TABLE 7

| Glycidoxypropyltriethoxysilane (GPTES) | 11.85 g (50.2 mmol) |
| Hexyltriethoxysilane (HeTES) | 31.82 g (154.2 mmol) |
| Phenyltriethoxysilane (PhTES) | 37.07 g (154.2 mmol) |
| Water | 11.62 g |
| Ethanol | 84.48 g |

A coating stock solution 3 and a charging roller 17 were produced as in Example 13, except that the sol of condensate 3 was used. The evaluations and the measurements on this charging roller and a surface layer thereof were made in the same way as in Example 1.

Example 18

A surface layer-forming coating solution was prepared as described below.

At room temperature, 63.64 g (223.9 mmol) of titanium (IV) isopropoxide (manufactured by Kojundo Chemical Laboratory Co., Ltd.) was mixed with 176.88 g of the sol of condensate 1 prepared in the same way as in Example 1. The mixture was stirred at room temperature for 3 hours to prepare a sol fluid of condensate 4. A sequence of stirring was performed at a speed of 750 rpm. Ti/Si=1.0.

To 25 g of this sol fluid of condensate 4, 2.00 g of an aromatic sulfonium salt (trade name: ADECAOPTOMER SP-150, manufactured by Asahi Denka Kogyo K.K.), serving as a cationic photopolymerization catalyst, diluted with methanol to 10% by mass was added. Thereby, a coating stock solution 4 was prepared. The coating stock solution 4 was diluted with a 1:1 (mass ratio) ethanol/2-butanol mixed solvent so as to have a solid content of 0.1% by mass, thereby preparing a surface layer-forming coating solution 4. A charging roller 18 was produced in the same way as in Example 1, except that the surface layer-forming coating solution 4 was used. The evaluations and the measurements on this charging roller and a surface layer thereof were made in the same way as in Example 1.

Example 19

A charging roller 19 was produced as in Example 18, except that the amount of the polyethylene particles used for the elastic layer was changed to 10 parts by mass and that the solid content of the surface layer-forming coating solution was changed to 1.0% by mass. The evaluations and the measurements on this charging roller and a surface layer thereof were made in the same way as in Example 1.

Example 20

A surface layer-forming coating solution was prepared as described below.

At room temperature, 130.42 g (458.8 mmol) of titanium (IV) isopropoxide (manufactured by Kojundo Chemical Laboratory Co., Ltd.) was mixed with 46.38 g of the sol of condensate 1 prepared in the same way as in Example 1. The mixture was stirred at room temperature for 3 hours to prepare a sol fluid of condensate 5. A sequence of stirring was performed at a speed of 750 rpm. Ti/Si=5.0.

To 25 g of this sol fluid of condensate 5, 0.40 g of an aromatic sulfonium salt (trade name: ADECAOPTOMER SP-150, manufactured by Asahi Denka Kogyo K.K.), serving as a cationic photopolymerization catalyst, diluted with methanol to 10% by mass was added. Thereby, a coating stock solution 5 was prepared. The coating stock solution 5 was diluted with a 1:1 (mass ratio) ethanol/2-butanol mixed solvent so as to have a solid content of 0.1% by mass, thereby preparing a surface layer-forming coating solution 5. A charging roller 20 was produced in the same way as in Example 19, except that the surface layer-forming coating solution 5 was used. The evaluations and the measurements on this charging roller and a surface layer thereof were made in the same way as in Example 1.

Comparative Example 1

A charging roller 21 was produced as in Example 1, except that the elastic layer did not contain the polyethylene particles. The evaluations and the measurements on this charging roller and a surface layer thereof were made in the same way as in Example 1.

Comparative Example 2

A charging roller 22 was produced as in Example 7, except that the surface layer was not formed. The evaluations and the measurements on this charging roller were made in the same way as in Example 1.

The results of the evaluations and the measurements on the charging rollers according to the foregoing examples and comparative examples are described in Table 8.

TABLE 8

| | Measurement results | | | | | |
|---|---|---|---|---|---|---|
| | Measurement 1 Elastic modulus (MPa) | Measurement 2 Thickness (nm) | Measurement 3 Surface roughness Rzjis1994 (μm) | Image evaluation | Evaluation 2 | |
| | | | | Evaluation 1 | First sheet | 2501st sheet |
| Example 1 | 1400 | 140 | 17 | A | A | A |
| Example 2 | 1400 | 11 | 17 | B | A | A |
| Example 3 | 1400 | 320 | 17 | A | A | A |
| Example 4 | 1400 | 940 | 17 | A | A | A |
| Example 5 | 1400 | 140 | 13 | B | A | A |
| Example 6 | 1400 | 140 | 19 | A | A | A |
| Example 7 | 1400 | 140 | 10 | B | A | A |
| Example 8 | 1400 | 140 | 9 | C | A | A |
| Example 9 | 1400 | 140 | 20 | A | A | B |
| Example 10 | 1400 | 140 | 11 | B | A | A |
| Example 11 | 1400 | 140 | 10 | C | A | A |
| Example 12 | 1400 | 140 | 12 | B | A | A |
| Example 13 | 1400 | 140 | 14 | A | A | A |
| Example 14 | 1400 | 140 | 16 | A | A | A |
| Example 15 | 1400 | 140 | 11 | B | A | A |
| Example 16 | 1100 | 140 | 14 | B | A | A |
| Example 17 | 1200 | 140 | 14 | B | A | A |
| Example 18 | 2730 | 11 | 17 | A | A | A |
| Example 19 | 2730 | 140 | 13 | A | A | A |
| Example 20 | 7060 | 11 | 13 | A | A | A |
| Comparative example 1 | 1400 | 11 | 4 | D | A | A |
| Comparative example 2 | — | — | 10 | C | B | C |

From the results described in Table 8, the charging roller according to Comparative Example 1, in which the polyethylene particles are not contained and the surface is not roughened, has a strong tendency to allow the toner to adhere to the surface of the photosensitive member. This will lead to the marked image defects due to faulty cleaning of the photosensitive member.

The charging roller according to Comparative Example 2 has no surface layer. It is thus speculated that the surface thereof wears unevenly because of the formation of a large number of sheets of electrophotographic images, thereby resulting in nonuniform charging performance.

According to the present invention, it is possible to provide a charging member having charging performance that is not easily changed. Furthermore, according to the present invention, it is possible to provide an electrophotographic apparatus capable of stably forming a high-quality electrophotographic image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A charging member comprising:
an electro-conductive support,
an elastic layer containing electro-conductive particles dispersed in the elastic layer, and
a surface layer, wherein
the elastic layer holds polyethylene particles in such a manner that at least a part of the polyethylene particles are exposed from the elastic layer, and a surface of the elastic layer is roughened thereby,
the surface of the elastic layer is covered with the surface layer in such a manner that the surface shape of the elastic layer is reflected in the surface shape of the charging member, and wherein
the surface layer contains a high-molecular compound having a constitutional unit represented by formula (1):

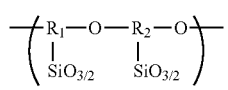
(1)

(wherein in formula (1), $R_1$ and $R_2$ each independently represent any one of formulae (2) to (5):

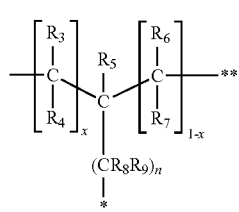
(2)

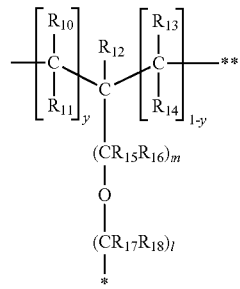
(3)

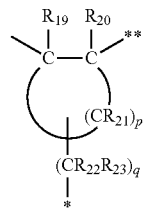
(4)

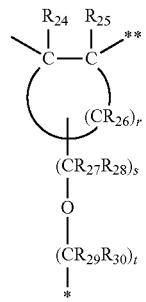
(5)

wherein in formulae (2) to (5), $R_3$ to $R_7$, $R_{10}$ to $R_{14}$, $R_{19}$, $R_{20}$, $R_{24}$, and $R_{25}$ each independently represent hydrogen, an alkyl group having 1 to 4 carbon atoms, a hydroxy group, a carboxyl group, or an amino group; $R_8$, $R_9$, $R_{15}$ to $R_{18}$, $R_{22}$, $R_{23}$, and $R_{27}$ to $R_{30}$ each independently represent hydrogen or an alkyl group having 1 to 4 carbon atoms; n, m, l, q, s, and t each independently represent an integer of 1 to 8; p and r each independently represent an integer of 4 to 12; x and y each independently represent 0 or 1; the symbols "*" represent a binding site to a corresponding one of the silicon atoms in formula (1).

2. The charging member according to claim 1, wherein the polyethylene particles are composed of a polyethylene having a weight-average molecular weight of two million or more.

3. The charging member according to claim 1, wherein the polyethylene particles are 5% by mass or more and 50% by mass or less with respect to the elastic layer.

4. The charging member according to claim 1, wherein the polyethylene particles have an average particle size of 10 μm or more and 40 μm or less.

5. The charging member according to claim 1, wherein the surface layer has an elastic modulus of 1,000 MPa or more and 20,000 MPa or less.

6. The charging member according to claim 1, wherein the ten-point height of irregularities of a surface of the surface layer is in the range of 5 to 30 μm.

7. The charging member according to claim 1, wherein the high-molecular compound having a constitutional unit represented by the formula (1) is produced by a hydrolyzed condensate of a hydrolyzable silane compound containing a compound represented by formula (10):

$$R_{31}-Si(OR_{32})(OR_{33})(OR_{34}) \quad \text{formula (10)}$$

(wherein in formula (10), $R_{32}$, $R_{33}$, and $R_{34}$ each independently represent an alkyl group having 1 to 4 carbon atoms; and $R_{31}$ represents any one of formulae (12) to (15):

(12)

$$\underset{R_{41}}{\overset{R_{40}}{>}}C\overset{O}{\underset{}{\triangle}}C\underset{R_{42}}{\overset{}{<}}(CR_{43}R_{44})_{n'}-*$$

(13)

$$\underset{R_{46}}{\overset{R_{45}}{>}}C\overset{O}{\underset{}{\triangle}}C\underset{R_{47}}{\overset{}{<}}(CR_{48}R_{49})_{m'}-O-(CR_{50}R_{51})_{l'}-*$$

(14)

$$\underset{R_{52}}{>}C\overset{O}{\underset{}{\triangle}}C\underset{R_{53}}{<}$$
$$(CR_{54})_{p'}$$
$$(CR_{55}R_{56})_{q'}$$
$$|$$
$$*$$

(15)

$$\underset{R_{57}}{>}C\overset{O}{\underset{}{\triangle}}C\underset{R_{58}}{<}$$
$$(CR_{59})_{r'}$$
$$(CR_{60}R_{61})_{s'}$$
$$|$$
$$O$$
$$|$$
$$(CR_{62}R_{63})_{t'}$$
$$|$$
$$*$$

(wherein in formulae (12) to (15), $R_{40}$ to $R_{42}$, $R_{45}$ to $R_{47}$, $R_{52}$, $R_{53}$, $R_{57}$, and $R_{58}$ each independently represent hydrogen, an alkyl group having 1 to 4 carbon atoms, a hydroxy group, a carboxyl group, or an amino group; $R_{43}$, $R_{44}$, $R_{48}$ to $R_{51}$, $R_{55}$, $R_{56}$, and $R_{60}$ to $R_{63}$ each independently represent hydrogen or an alkyl group having 1 to 4 carbon atoms; $R_{54}$ and $R_{59}$ each independently represent hydrogen, an alkoxy group having 1 to 4 carbon atoms, or an alkyl group having 1 to 4 carbon atoms; n', m', l', q', s', and t' each independently represent an integer of 1 to 8; p' and r' each independently represent an integer of 4 to 12; and each of the symbols "*" represents a binding site to the silicon atom in formula (10) described above)).

8. The charging member according to claim 7, wherein the hydrolyzable silane compound further contains a compound represented by formula (11):

$$R_{63}-Si(OR_{64})(OR_{65})(OR_{66}) \quad \text{formula (11)}$$

(wherein in formula (11), $R_{64}$, $R_{65}$, and $R_{66}$ each independently represent an alkyl group having 1 to 4 carbon atoms; and $R_{63}$ represents an alkyl group having 6 to 10 carbon atoms or a phenyl group).

9. An electrophotographic apparatus comprising an electrophotographic photosensitive member, and a charging member arranged in contact with the electrophotographic photosensitive member, wherein the charging member is the charging member according to claim 1.

10. The charging member according to claim 1, wherein the formula (4) has the structure represented by formula (8):

(8)

$$(CH_2)_Q$$
$$|$$
$$*$$

(wherein in formula (8), Q represents an integer of 1 to 8).

11. The charging member according to claim 1, wherein the formula (5) has the structure represented by formula (9):

(9)

$$(CH_2)_S$$
$$|$$
$$O$$
$$|$$
$$(CH_2)_T$$
$$|$$
$$*$$

(wherein in formula (9), each of S and T represents an integer of 1 to 8).

12. A charging member comprising:
an electro-conductive support,
an elastic layer containing electro-conductive particles dispersed in the elastic layer, and
a surface layer, wherein
the elastic layer holds polyethylene particles in such a manner that at least a part of the polyethylene particles are exposed from the elastic layer, and a surface of the elastic layer is roughened thereby,
the surface of the elastic layer is covered with the surface layer in such a manner that the surface shape of the elastic layer is reflected in the surface shape of the charging member, and wherein
the surface layer contains a high-molecular compound having a constitutional unit represented by formula (1):

(1)

$$\left(\begin{array}{cc} R_1-O-R_2-O \\ | & | \\ SiO_{3/2} & SiO_{3/2} \end{array}\right)$$

(wherein in formula (1), $R_1$ and $R_2$ each independently represent any one of formulae (2), (3), (8) and (9):

(2)

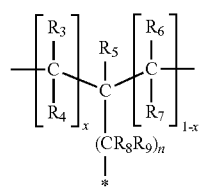

(3)

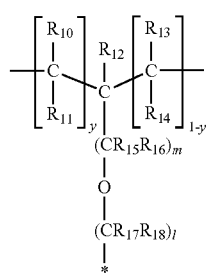

(8)

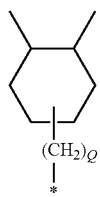

(9)

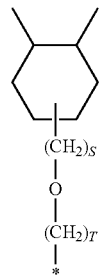

wherein in formulae (2), (3), $R_3$ to $R_7$, $R_{10}$ to $R_{14}$, each independently represent hydrogen, an alkyl group having 1 to 4 carbon atoms, a hydroxy group, a carboxyl group, or an amino group; $R_8$, $R_9$, $R_{15}$ to $R_{18}$, each independently represent hydrogen or an alkyl group having 1 to 4 carbon atoms; n, m, and l, each independently represent an integer of 1 to 8; x and y each independently represent 0 or 1;

in formulae (8) and (9), Q, S and T each independently represent an integer of 1 to 8; and in formulae (2), (3), (8) and (9), the symbols "*" represents a binding site to a corresponding one of the silicon atoms in formula (1).

* * * * *